United States Patent
Kim et al.

[19]

[11] Patent Number: 6,101,086
[45] Date of Patent: Aug. 8, 2000

[54] PORTABLE COMPUTER WITH HAND GRIP

[75] Inventors: Jung-Hoon Kim; Young-Won Kim, both of Seoul, Rep. of Korea

[73] Assignee: SamSung Electronics Co., Ltd., Suwon, Rep. of Korea

[21] Appl. No.: 09/047,521

[22] Filed: Mar. 25, 1998

[30] Foreign Application Priority Data

Mar. 25, 1997 [KR] Rep. of Korea ...................... 97-10227

[51] Int. Cl.[7] .......................................................... G06F 1/16
[52] U.S. Cl. ............................................. 361/683; 108/43
[58] Field of Search .................................... 361/683, 685; 312/223.2; 364/108.1; 108/43; 206/45.23, 320

[56] References Cited

U.S. PATENT DOCUMENTS

| | | |
|---|---|---|
| 4,402,441 | 9/1983 | Jones . |
| 4,715,293 | 12/1987 | Cobbs . |
| 4,803,652 | 2/1989 | Maeser et al. ...................... 364/708.1 |
| 5,100,098 | 3/1992 | Hawkins . |
| 5,158,257 | 10/1992 | Wilson . |
| 5,217,119 | 6/1993 | Hollingsworth ........................ 206/583 |
| 5,494,157 | 2/1996 | Golenz et al. ........................... 206/370 |
| 5,570,780 | 11/1996 | Miller . |
| 5,667,114 | 9/1997 | Bourque . |
| 5,713,548 | 2/1998 | Boyer et al. . |
| 5,717,567 | 2/1998 | Tao .......................................... 361/683 |
| 5,724,225 | 3/1998 | Hrusoff et al. . |
| 5,825,614 | 10/1998 | Kim ......................................... 361/683 |
| 5,845,978 | 12/1998 | Jung ...................................... 312/223.2 |

Primary Examiner—Leo P. Picard
Assistant Examiner—John D. Reed
Attorney, Agent, or Firm—Robert E. Bushnell, Esq.

[57] ABSTRACT

A portable computer is provided that has hand grips on both sides of the main body of the computer. The hand grips allow the computer to be carried with two hands when the display screen is in an open position and allow the computer to be carried with one hand when the display screen is in a closed position. Additionally, a rubber bumper may be installed around the hand grips and the side of the main body of the computer to increase the ability of the computer to withstand impacts with foreign object. Furthermore, the computer may be designed with any one of an elliptical prism shape, a circular prism shape, and an oblong prism shape to further reduce the stress experienced by the computer when the computer undergoes an impact with a foreign object.

For situations when a user wishes to transport the laptop computer without holding the computer in either hand, a shoulder strap may be fastened to the hand grips to allow the computer to be carried over a shoulder.

24 Claims, 8 Drawing Sheets

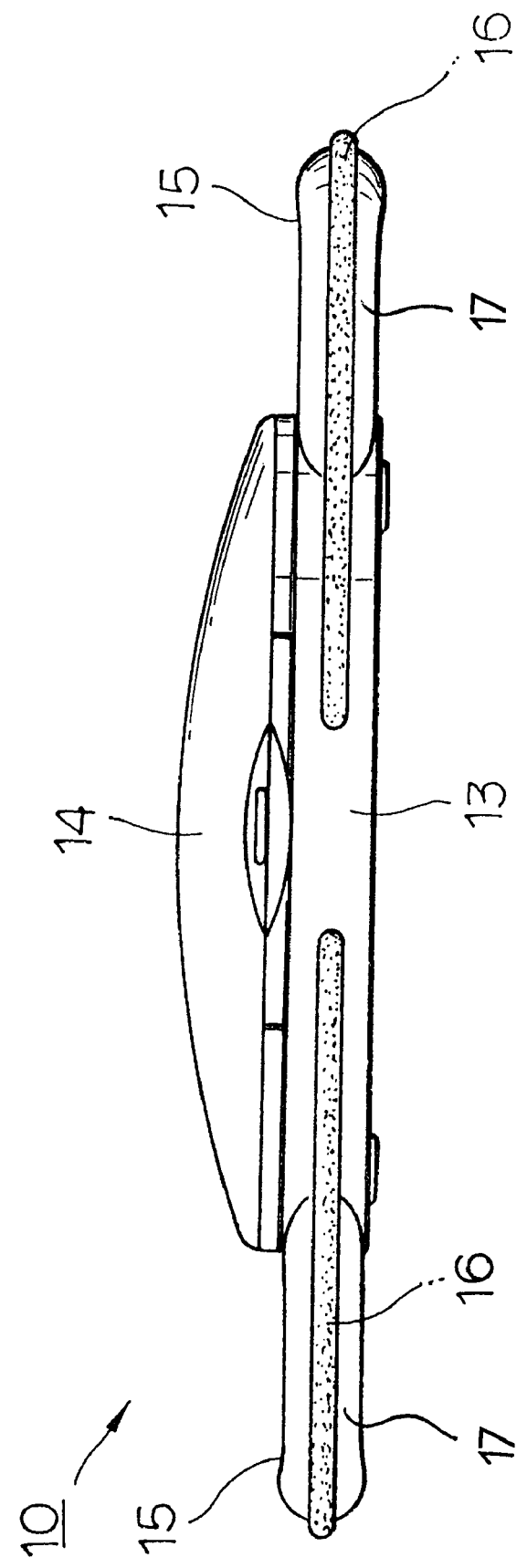

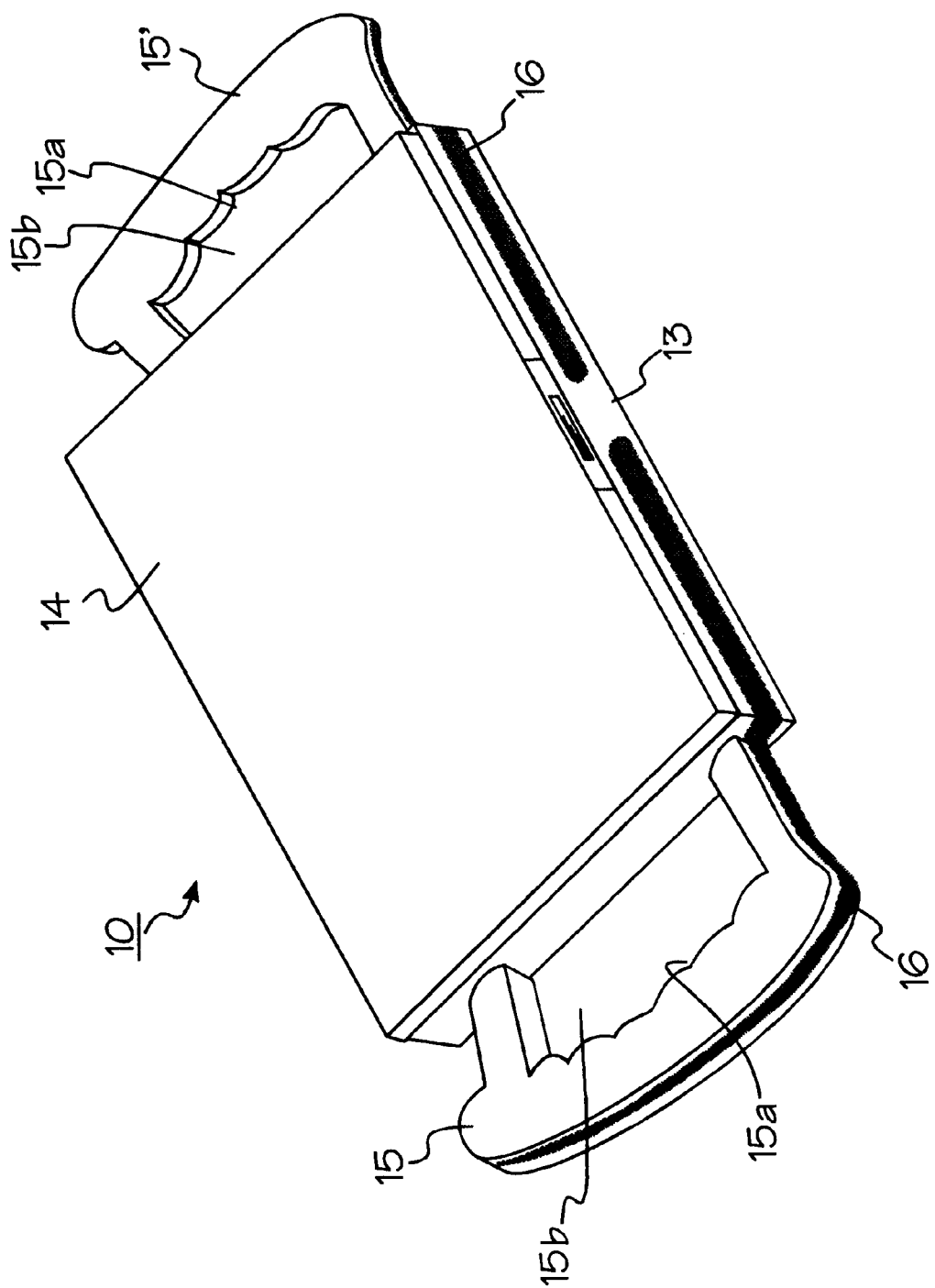

PORTABLE COMPUTER WITH HAND GRIP

This application makes reference to, incorporates the same herein, and claims all benefits accruing under 35 U.S.C. §119 from my application entitled Portable Computer with Hand Straps filed with the Korean Industrial Property Office on the day of Mar. 25, 1997 and there duly assigned Ser. No. 1997/10227 by that Office.

BACKGROUND OF THE INVENTION

1. Field of the Invention

The present invention relates to a portable computer and, more specifically, to a portable computer that has hand grips and an attachable shoulder strap to facilitate the transporting of the portable computer.

2. Background Art

Microcomputers, such as portable computers and notebook computers, are relatively heavy and expensive, and can contain vast amounts of information that is vital to business and industry. Certain portions of portable computers are subject to damage from impact, for example, hard disk drives and liquid crystal displays. Thus, great effort has been expended to insulate portable computers from impact when being transported and to create containers for transporting the computers.

One of the greatest utilities of a notebook computer is its portability and simplicity of transport. Some techniques and devices for transporting portable computers are shown, for example, in U.S. Pat. No. 5,494,157 to Golenz entitled Computer Bag With Side Accessible Padded Compartments, U.S. Pat. No. 5,713,548 to Boyer entitled System for Retaining a Computer or Other Article on the Human Body, U.S. Pat. No. 4,715,293 to Cobbs entitled Body-Supported Hand-Operated Instrument Desk, U.S. Pat. No. 4,402,441 to Jones entitled Musical Instrument Carrier, U.S. Pat. No. 5,724,225 to Hrusoff entitled Laptop Computer Carrying Tray, U.S. Pat. No. 5,667,114 to Bourque entitled Carrying Apparatus for a Portable Computer, U.S. Pat. No. 5,570,780 to Miller entitled Portable Computer Carrying Case, U.S. Pat. No. 5,100,098 to Hawkins entitled Stand and Handle for Hand Held Computer, and U.S. Pat. No. 5,158,257 to Wilson entitled Portable Keyboard Support. The contemporary art provides many cases for the transport of portable computers but all the methods take time to pack away the portable computer or attach it to a device used for transport. Thus, the effective transportation of the portable computer or notebook consumes time to ensure that the computer is not exposed to undue risk of damage. By way of example, a typical portable computer uses a bag that is opened or closed with a zipper. Whenever the portable computer is to be transported, the bag must be opened, the computer must be secured inside the bag, and then the bag has to be closed prior to transporting the document. This wastes time and adds inconvenience to one who needs to transport a portable computer often. Additionally, the contemporary portable computers can be difficult to carry due to how easy it is for a portable computer to slip out of a user's grip. Furthermore, the portable computer can be easily damaged while being carried by being bumped into objects. As such, I believe it may be possible to improve on the contemporary art by providing a portable computer that is easy to transport without an additional case or bag, that is easy for a user to grip, and that can withstand minor impacts with objects without sustaining serious damage.

SUMMARY OF THE INVENTION

Accordingly, it is an object of the present invention to provide a portable computer that is easier to transport without devoting time to packing the computer in a case or a bag.

It is another object to provide a portable computer that is easier for a user to grip and that reduces the chance of accidental slippage of the computer from a user's grasp.

It is still another object to provide a portable computer that can withstand minor impacts with other objects while being carried without sustaining serious damage.

To achieve these and other objects, a portable computer is provided that has hand grips on both sides of the main body of the portable computer. The hand grips allow the computer to be carried with two hands when the display screen is in an open position and allow the computer to be carried with one hand when the display screen is in a closed position. Additionally, a rubber bumper may be installed around the hand grips and the side of the main body of the portable computer to increase the ability of the portable computer to withstand impacts with foreign object. Furthermore, the portable computer may be designed with any one of an elliptical prism shape, a circular prism shape, and an oblong prism shape to further reduce the stress experienced by the portable computer when the computer undergoes an impact with a foreign object.

For situations when a user wishes to transport the laptop computer without holding the computer in either hand, a shoulder strap may be fastened to the hand grips to allow the portable computer to be carried over a shoulder.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 is a front view of the portable computer of FIG. 2 illustrating the elastic bumper that is used to increase the portable computer's ability to withstand impacts.

FIG. 8 is a perspective view of a portable computer as constructed according to the principles of the present invention without the computer having a quasi circular prism shape.

DETAILED DESCRIPTION OF THE DRAWINGS

Figure 1:
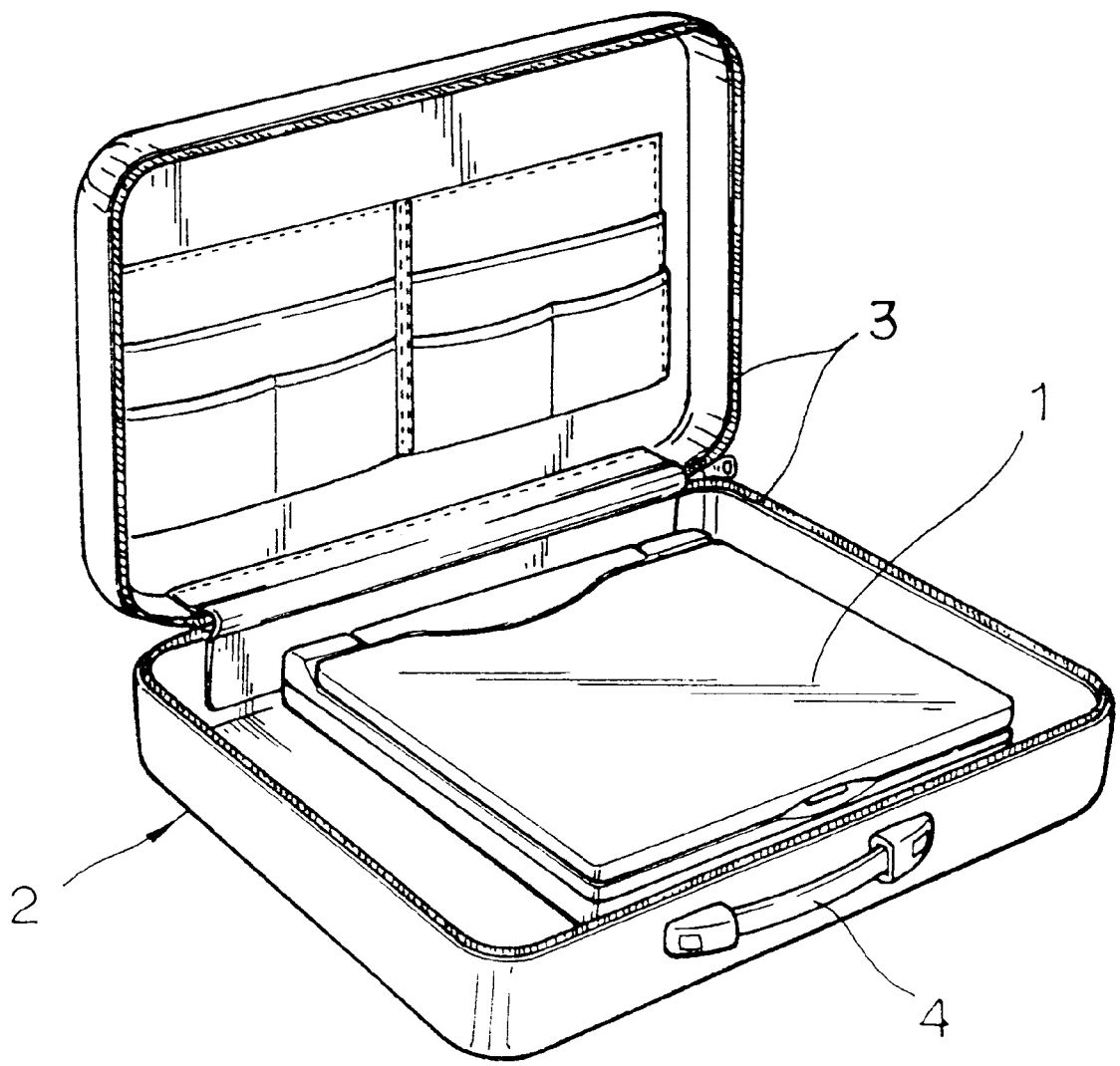
FIG. 1 is a perspective view of a portable computer and a carrying case.
Figure 2:
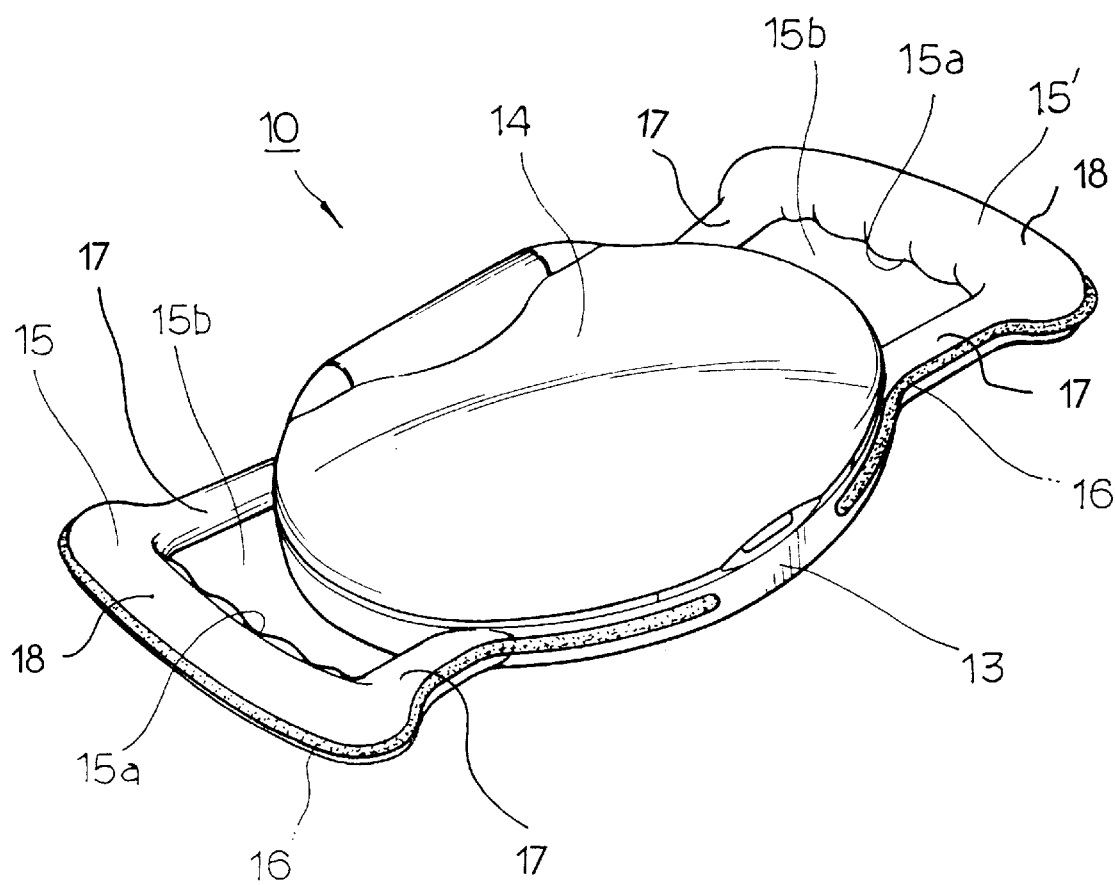
FIG. 2 is a perspective view of a portable computer as constructed in accordance with the principles of the present invention.

Turning now to the drawings, FIG. 1 illustrates a portable computer, such as a hand-held computer, a desk top computer or a notebook computer, and a carrying case. Carrying case 2 is opened and closed using zipper 3 and hand grip 4 is used to hold and carry portable computer 1 when the computer is packed in carrying case 2. To safely and effectively transport portable computer 1, the computer must be packed inside of carrying case 2 and the case has to be closed via zipper 3.

FIGS. 2–8 show a portable computer as constructed according to the principles of the present invention. A computer such as portable computer 10 may be constructed using monitor 14 pivotally attached to main body 13. Main body 13 has keyboard 11, input device 12 (such as a mouse), a central processing unit (not shown), and a memory (not shown).

Figure 3:
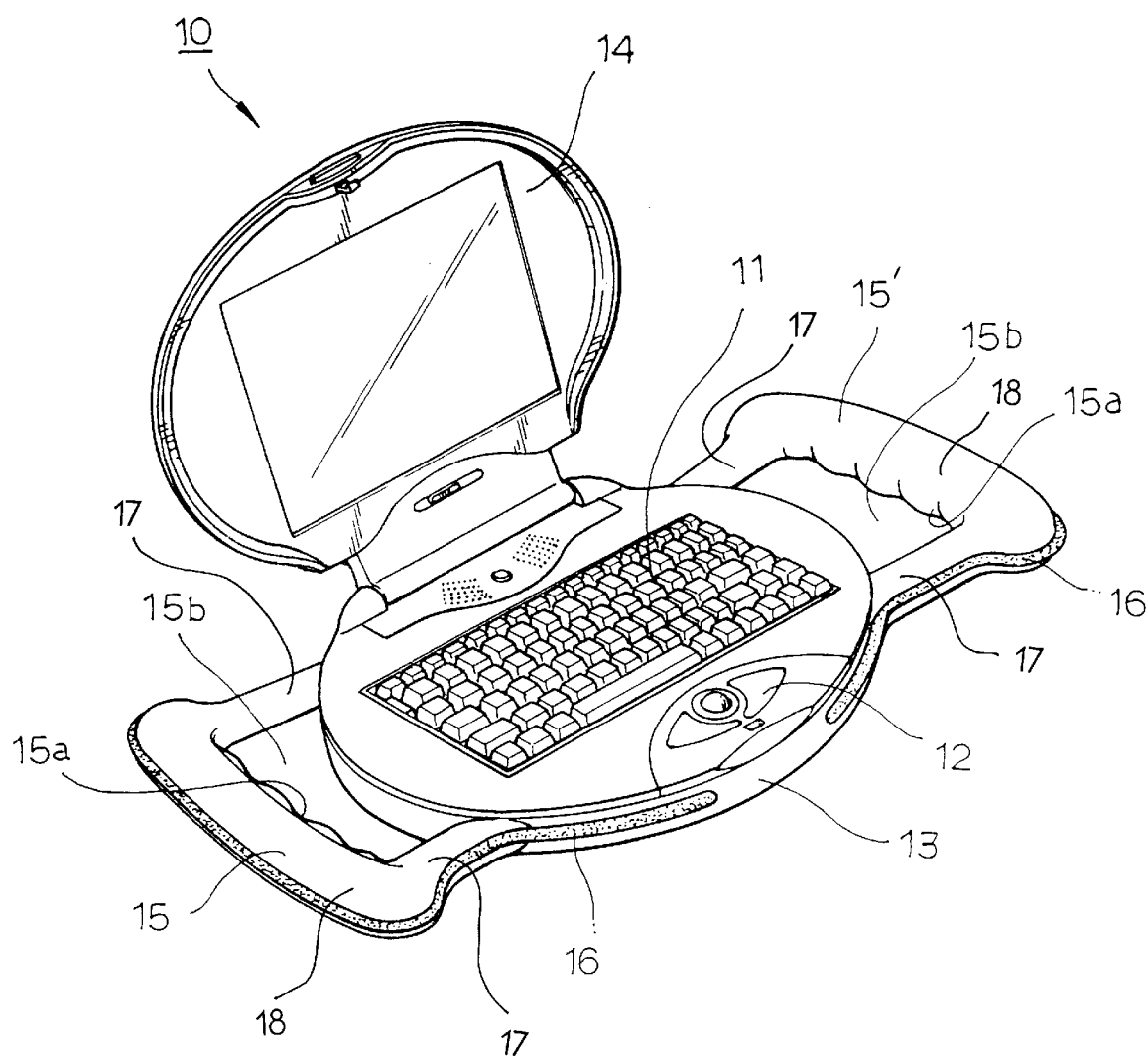
FIG. 3 is a perspective view of the portable computer of FIG. 2 showing the portable computer with the monitor in an open position.

Portable computer 1 is constructed with hand grips 15 and 15' attached to main body 13. The portable computer may be constructed using only one hand grip and still gain the advantage of easier transportation. Hand grips 15 and 15' project outward from the sides of main base 13 parallel to the plane of the base of the portable computer. The hand grips may be constructed of two outwardly protruding members 17 that are connected by traversing member 18. While not necessary, hand grips 15 and 15' are positioned diametrically opposite from each other to simplify the carrying of the portable computer while the monitor is in an open position, as shown in FIG. 3.

Hand grips 15 and 15' may have integrally formed grooves 15a positioned along traversing member 18 to conform the hand grip to a user's hand by allowing one's fingers to be inserted along the grooves. Finger grooves 15a facilitate the conveyance of the portable computer and further reduce the prospect of the computer sliding out of the hands of a user. Finger grooves 15a are shown in FIG. 3 along traversing member 18 facing inward toward main body 13 of portable computer 10. The hand grips may be constructed separately from the computer and added as a retrofit or the hand grips may be integrally formed with the chassis of the portable computer.

Alternatively, portable computer 10 may be carried using only one of hand grips 15 and 15'. This may be especially convenient when moving the computer only a short distance. Additionally, the portable computer can be transported using both hands to support the computer via both hand grips 15 and 15'. Being able to carry the computer via both hand grips is especially useful if one wants to move the computer while leaving the monitor in an open position.

Figure 4:
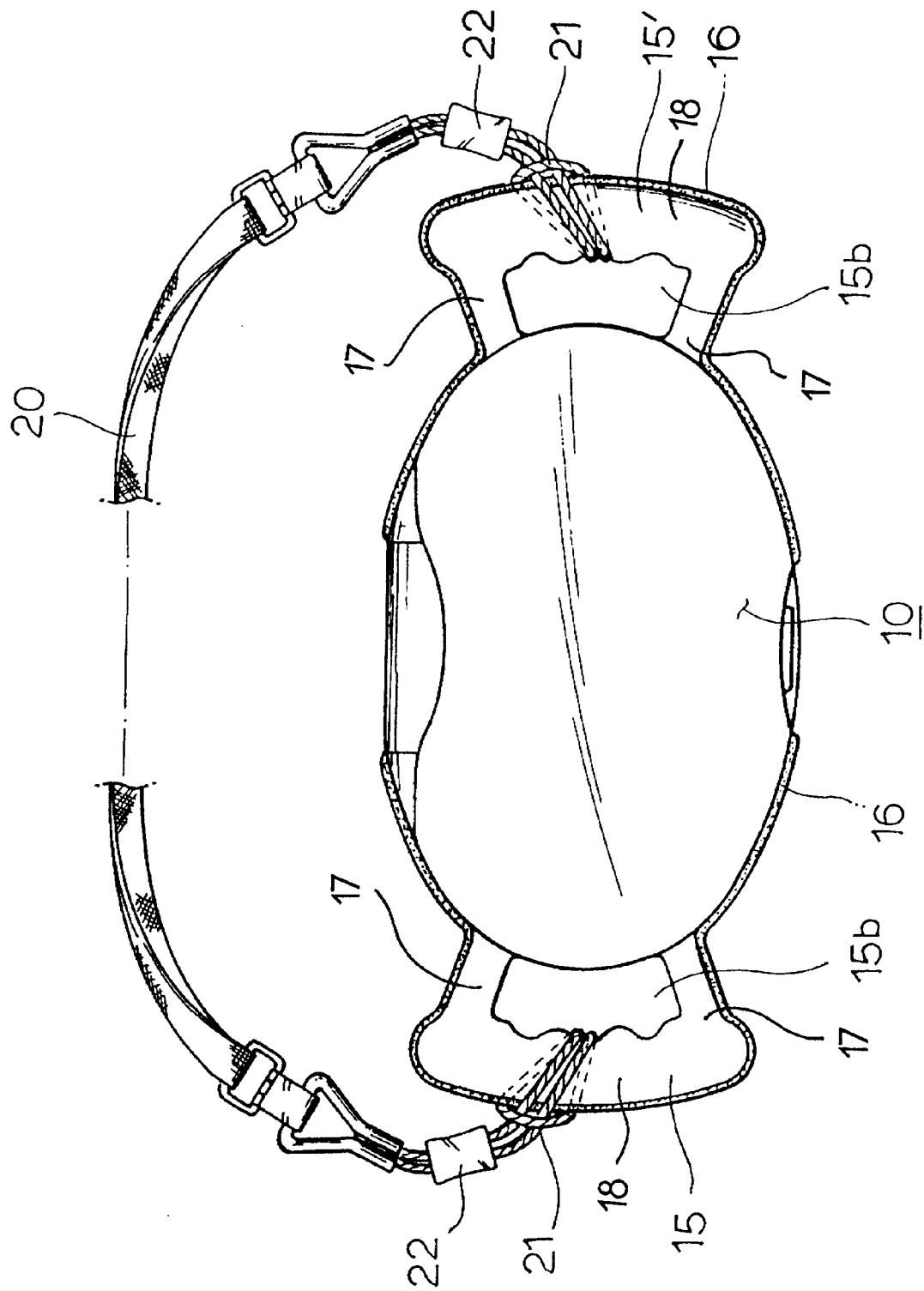
FIG. 4 is a plan view of the portable computer of FIG. 2 showing the portable computer of FIG. 2 with the monitor in a closed position and a shoulder strap attached to the handle grips.
Figure 5:
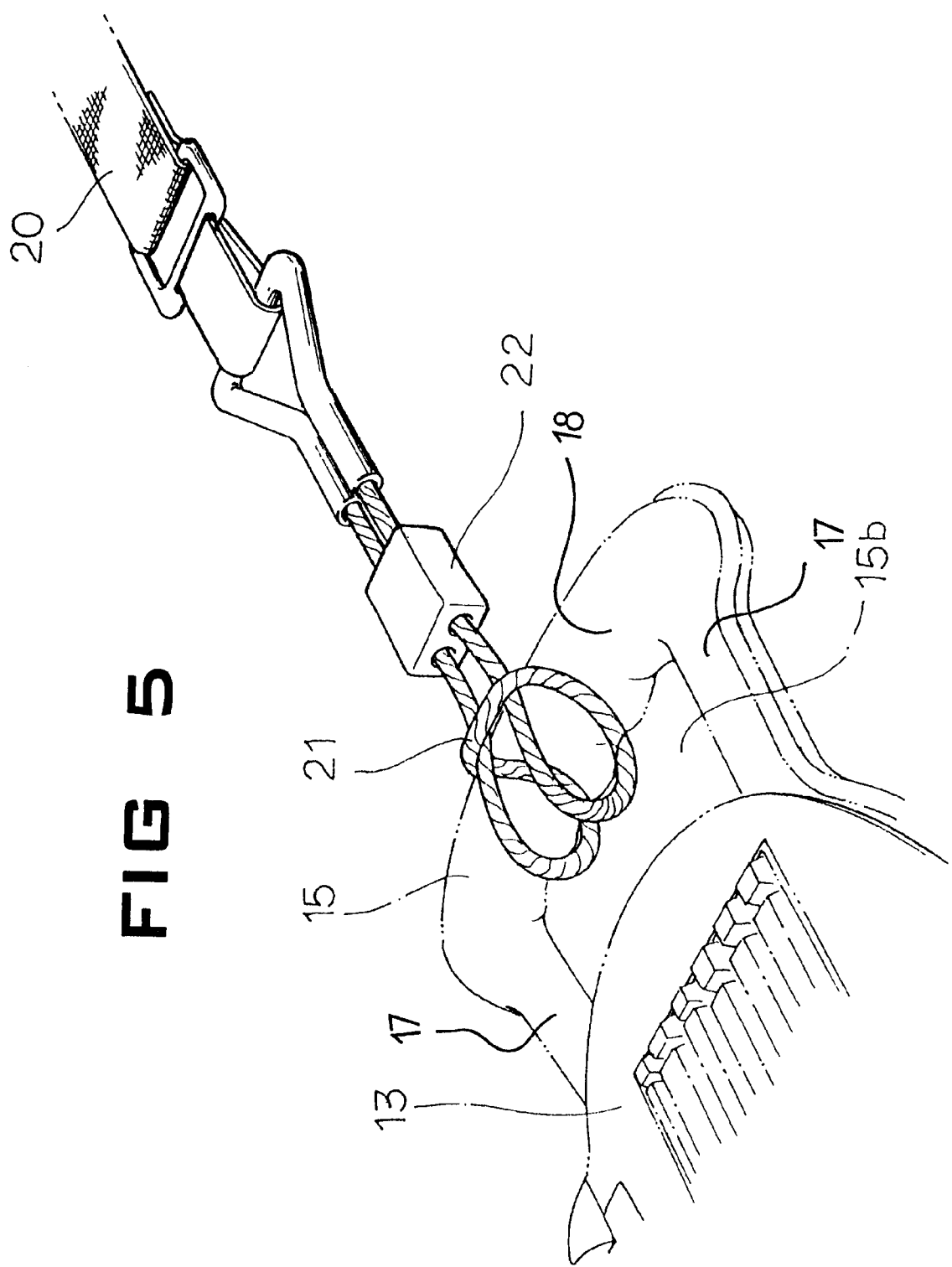
FIG. 5 is a partially enlarged perspective view of the portable computer of FIG. 2 showing one way that a shoulder strap can be connected to a hand grip.

As shown in FIGS. 4 and 5, shoulder strap 20 may be fastened to hand grips 15 and 15' to allow portable computer 10 to be carried on a user's shoulder. Shoulder strap 20 may be constructed using rope 21 that is inserted into hand grip hole 15b of hand grips 15 and 15' and then fastened to the hand grips. Rope 21 can then be secured using fastening piece 22. Many different types of shoulder straps and connectors can be used. The shoulder strap shown in the figures is just used as an example. In both FIGS. 4 and 5, shoulder strap 20 is secured around traversing member 18 of the hand grip.

Figure 6:
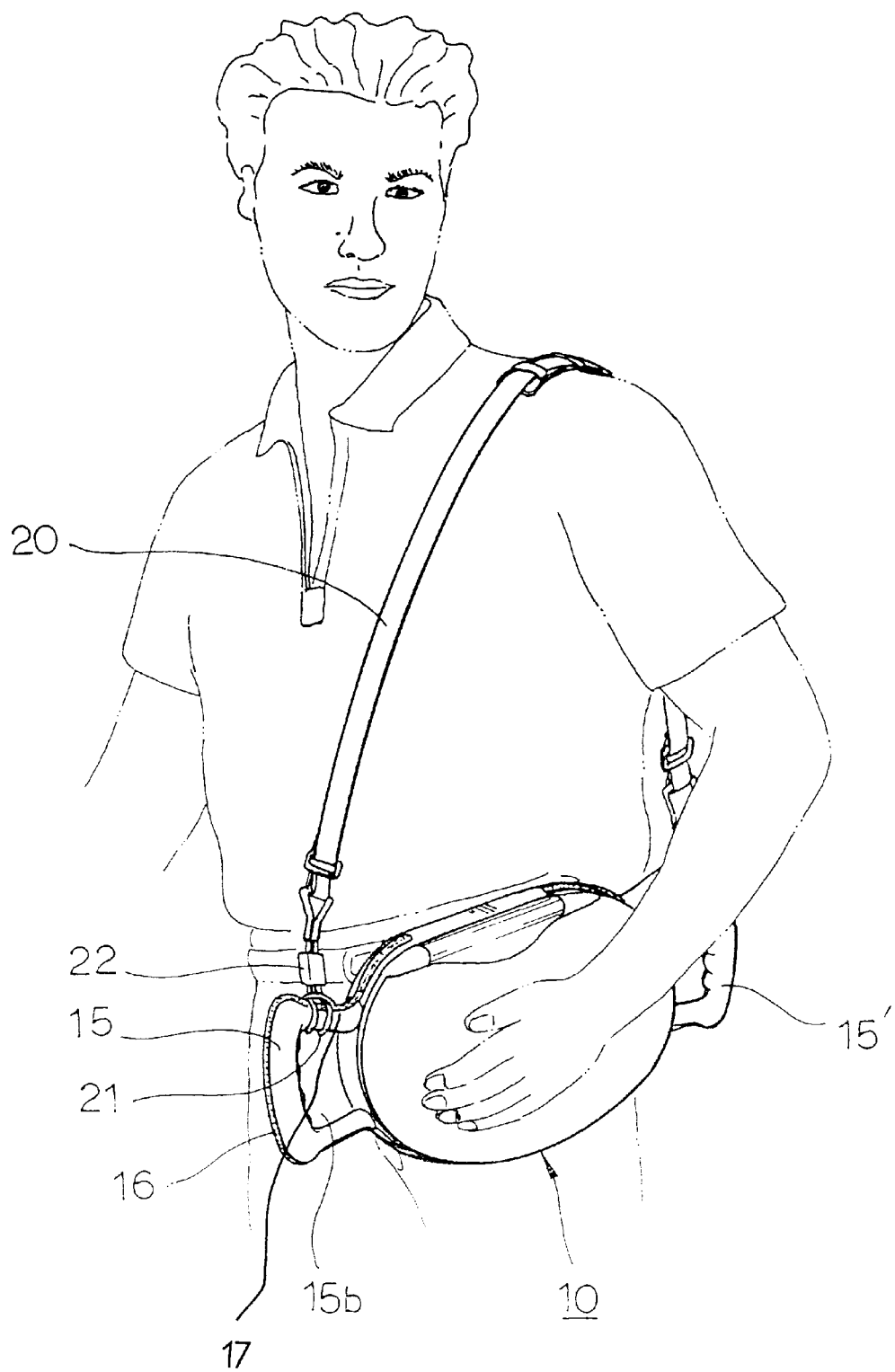
FIG. 6 is a perspective view of the portable computer of FIG. 2 being carried by a user.

FIG. 6 illustrates a user carrying portable computer 10 via shoulder strap 20. Shoulder strap 20 is secured to protruding member 17 of hand grips 15 and 15'. By carrying the computer over a shoulder, a user can transport the portable computer with limiting one's freedom of movement and while leaving both hands free. The portable computer of the present invention may be positioned for use more quickly than the portable computers of the contemporary art after being transported.

While carrying portable computer 10 during transport, it is very easy to impact the computer against foreign objects. To alleviate some of the shock of impact elastic bumper 16 can be attached around hand grips 15 and 15' and the sides of main body 13. The elastic bumper projects laterally from the portable computer to receive impacts due to collision with other objects. The elastic bumper may be constructed of a rubber material to buffer the shock transmitted to the chassis of the portable computer. To further reduce the stress the chassis undergoes during an impact the portable to computer main body and monitor can have any one of a substantially circular prism shape, an elliptical prism shape, and an oblong prism shape. This eliminates the higher stress that is experienced by the chassis when a corner of the portable computer impacts with a foreign object. Elastic member 16 protrudes outward slightly from the surface of main body 13 and hand grips 15 and 15', as shown in FIG. 7. FIG. 8 shows how a portable computer can be constructed according to the principles of the present invention without using a substantially elliptical prism shaped main body.

The portable computer of the present invention allows more comfortable and convenient transportation of the portable computer. The hand grips allow the portable computer to be transported with the monitor in either an open position or a closed position. By using the inventive portable computer time is saved due to the elimination of needing to pack the computer prior to transporting the computer to another location.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A computer, comprising:
    a chassis having a main body and a monitor enclosing a variable visual display device, said main body having a keyboard, a memory, and a central processing unit driving said variable visual display device, said monitor being pivotally attached to said main body;
    said main body having a base and having any one of an elliptical prism shape, a circular prism shape, and an oblong prism shape;
    said monitor having a front side bearing a screen of said variable visual display device and having any one of an elliptical prism shape, a circular prism shape, and an oblong prism shape;
    a hard grip having a substantially U-shape being mounted on a side of said main body, and extending parallel to a plane of said base of said main body;
    an elastic bumper attached to both said handle and said portion of said side of said main body; and
    said computer being carryable via said hand grip.

2. The computer of claim 1, further comprising of another said hand grip, with both hand grips being attached in diametric opposition along said side wall of said main body.

3. The computer of claim 1, further comprised of a space formed between said side wall and said hand grip accommodating an insertion of user's hand.

4. The computer of claim 1, further comprised of a plurality of grooves formed on the inside of said hand grip to accommodate a user's fingers.

5. A computer comprising:
    a main body having a top surface a base, and a side wall connected between said top surface and said base, having a keyboard disposed on said top surface, a memory, and a central processing unit driving a variable visual display device said side wall having a first height;

a monitor having a front side bearing a screen of said variable visual display device pivotally attached to said main body; and a hand grip mounted on a first portion of said side wall of said main body, having a second height substantially same as said first height of said side wall.

6. The computer of claim 5, further comprised of said main body having any one an elliptical prism shape, a circular prism shape, and an oblong prism shape.

7. The computer of claim 5, further comprised of:

two beams projecting outward from said side wall of said main body, having a second height; and a traversing beam connecting said two beams to form said hand grip.

8. The computer of claim 5, further comprising two of said hand grips attached in diametric opposition along said side wall of said main body.

9. The computer of claim 5, further comprised of a space formed between said side wall and said hand grip accommodating an insertion of a user's hand.

10. The computer of claim 7, further comprised of a plurality of grooves formed on the inside of said traversing beam to accommodate a user's fingers.

11. The computer of claim 5, further comprised of an elastic bumper attached to outside of said hand grip and a second portion of said side wall.

12. A computer comprising:

a main body having a base a top surface, and a side wall connected between said base and said top surface, having, a keyboard disposed on said top surface, a memory, and a central processing unit driving a variable visual display device, said side wall having a first height, said top surface having a first length;

said monitor having a front side bearing a screen of said variable visual display device, pivotally attached to said main body;

a hand grip mounted on a portion of said side wall of said main body having a second height substantailly same as said first height of said side wall and a second length substantially same as said first length of said top surface.

13. The computer of claim 12, further comprised of said main body having any one an elliptical prism shape, a circular prism shape, and an oblong prism shape.

14. The computer of claim 12, further comprising two of said hand grip being attached on diametrically opposing sides of said main body.

15. The computer of claim 12, further further comprised of said hand grip including:

two beams projecting outward from said portion of said side wall of said main body; and a traversing beam connecting said two beams to form a handle.

16. The computer of claim 15, further comprised of a plurality of grooves formed on said traversing beam to accommodate a user's fingers.

17. The computer of claim 12, further comprised of an elastic bumper attached said outside of said hand grip and a second portion of said side wall.

18. A computer, comprising:

a chassis having an aggregate volume, comprising a main body exhibiting a second and lesser volume with an upper surface separated by an exterior periphery from a base, said main body being comprised of opposite ends each terminated by an exterior periphery exhibiting an approximately continuously curved arc, a keyboard supported by said main body and located within said upper surface between said opposite ends, a memory and a central processing unit encased by said main body, and a lid exhibiting a third and least volume supplementing said second volume to form said aggregate volume, pivotally attached to said main body at a location between said opposite ends to rotate between a closed orientation when engaging said main body and covering said keyboard, and an open orientation when exposing said keyboard and exposing said monitor while said monitor is driven by said central processing unit to illustrate variable visual displays; and a handle extending outwardly from said periphery along one of said opposite ends and, in combination with said periphery, forming a closed through aperture accommodating passage of a human hand.

19. The computer of claim 18, further comprising said lid having an exterior terminal perimeter conforming in shape to said periphery while said lid is in said closed orientation.

20. The computer of claim 18, further comprising said periphery defining an ellipsoid and said lid having an exterior terminal perimeter conforming in shape to said ellipsoid while said lid is in said closed orientation.

21. The computer of claim 18, further comprising another handle, with both handles being attached in diametric opposition to said periphery along different ones of said opposite ends.

22. The computer of claim 18, with said handle comprising first and second beams extending outwardly from said periphery along said one of said opposite sides and joined at distal ends by a hand grip having a thickness approximately equal to said main body.

23. The computer of claim 18, further comprising another handle, with both handles being attached in diametric opposition to said periphery along different ones of said opposite ends and with each handle comprising first and second beams extending outwardly from said periphery along different ones of said opposite sides and joined at distal ends by a hand grip having a thickness approximately equal to said main body.

24. The computer of claim 22, further comprised of:

said upper surface having a width; and said grip having a length substantially equal to said width.

* * * * *